(12) United States Patent
Miwa

(10) Patent No.: US 9,968,956 B2
(45) Date of Patent: May 15, 2018

(54) PAINTING FACILITY

(71) Applicant: Taikisha Ltd., Tokyo (JP)

(72) Inventor: Tomotaka Miwa, Tokyo (JP)

(73) Assignee: Taikisha Ltd., Tokyo (JP)

( * ) Notice: Subject to any disclaimer, the term of this patent is extended or adjusted under 35 U.S.C. 154(b) by 0 days. days.

(21) Appl. No.: 15/313,780

(22) PCT Filed: Apr. 7, 2015

(86) PCT No.: PCT/JP2015/060837
§ 371 (c)(1),
(2) Date: Nov. 23, 2016

(87) PCT Pub. No.: WO2015/182254
PCT Pub. Date: Dec. 3, 2015

(65) Prior Publication Data
US 2017/0189927 A1    Jul. 6, 2017

(30) Foreign Application Priority Data

May 26, 2014    (JP) .................................. 2014-108140

(51) Int. Cl.
*B05C 5/02*    (2006.01)
*B05B 13/04*    (2006.01)
(Continued)

(52) U.S. Cl.
CPC .......... *B05B 16/60* (2018.02); *B05B 13/0431* (2013.01); *B05B 16/20* (2018.02);
(Continued)

(58) Field of Classification Search
CPC ............ B05B 15/1248; B05B 15/1296; B05B 15/1288; B05B 15/1222; B05B 13/0431;
(Continued)

(56) References Cited

U.S. PATENT DOCUMENTS 4,211,155 A * 7/1980 Stoll ..................... B08B 15/023
454/57
5,165,969 A    11/1992 Barlett et al.
(Continued)

FOREIGN PATENT DOCUMENTS

DE    102010032144 A1    1/2012
JP    1168371 A    7/1989
(Continued)

OTHER PUBLICATIONS

English Translation of DE102010032144 published Jan. 26, 2012, Juergen et al (Eisenmann AG).*
(Continued)

*Primary Examiner* — Laura Edwards
(74) *Attorney, Agent, or Firm* — The Webb Law Firm

(57) ABSTRACT

By setting a robot installing area at a higher pressure than an adjacent painting area, there is formed an air flow which flows from the robot installing area into the painting area. With this, in a painting facility in which a painting object is painted by paint spraying from a sprayer while displacing the painting object held to an arm leading end portion of a painting robot relative to the sprayer by an action of the painting robot, adhesion of paint to the painting robot and to a painting area lateral wall is prevented.

9 Claims, 10 Drawing Sheets

(51) Int. Cl.
*B05C 15/00* (2006.01)
*B05C 5/00* (2006.01)

(52) U.S. Cl.
CPC .............. *B05C 5/00* (2013.01); *B05C 5/0208* (2013.01); *B05C 15/00* (2013.01); *Y10S 901/43* (2013.01)

(58) Field of Classification Search
CPC ..... B05B 15/1207; B05B 15/12; B05B 16/60; B05B 16/20; B05C 15/00; B05C 5/00; B05C 5/0208; Y10S 901/43
USPC .......... 454/50–52, 55; 901/43; 118/326, 323, 118/696, DIG. 7
See application file for complete search history.

(56) References Cited

U.S. PATENT DOCUMENTS

| | | | | |
|---|---|---|---|---|
| 5,277,652 A | * | 1/1994 | Minor | ................ B05B 15/1222 454/52 |
| 8,397,662 B2 | * | 3/2013 | Herre | .................. B05B 13/0221 118/300 |
| 2007/0281100 A1 | | 12/2007 | Herre et al. | |
| 2013/0026676 A1 | | 1/2013 | Tresse | |

FOREIGN PATENT DOCUMENTS

| | | | |
|---|---|---|---|
| JP | 4349960 A | 12/1992 | |
| JP | 531418 A | 2/1993 | |
| JP | 871488 A | 3/1996 | |
| JP | 10211406 A | 8/1998 | |
| JP | 1157554 A | 3/1999 | |
| JP | 200245739 A | 2/2002 | |
| JP | 2005103446 A | 4/2005 | |
| JP | 2010137204 A | 6/2010 | |
| JP | 2011183265 A | 9/2011 | |
| JP | 2014-240055 A | * | 12/2014 |

OTHER PUBLICATIONS

English Translation of JP05-031418 (Muramatsu) published Feb. 9, 1993.*
English Translation of JP2005-103446 (Mitsusaki et al) published Apr. 24, 2005.*
English Translation of JP10-211406 (Ono et al) published Aug. 11, 1998.*

* cited by examiner

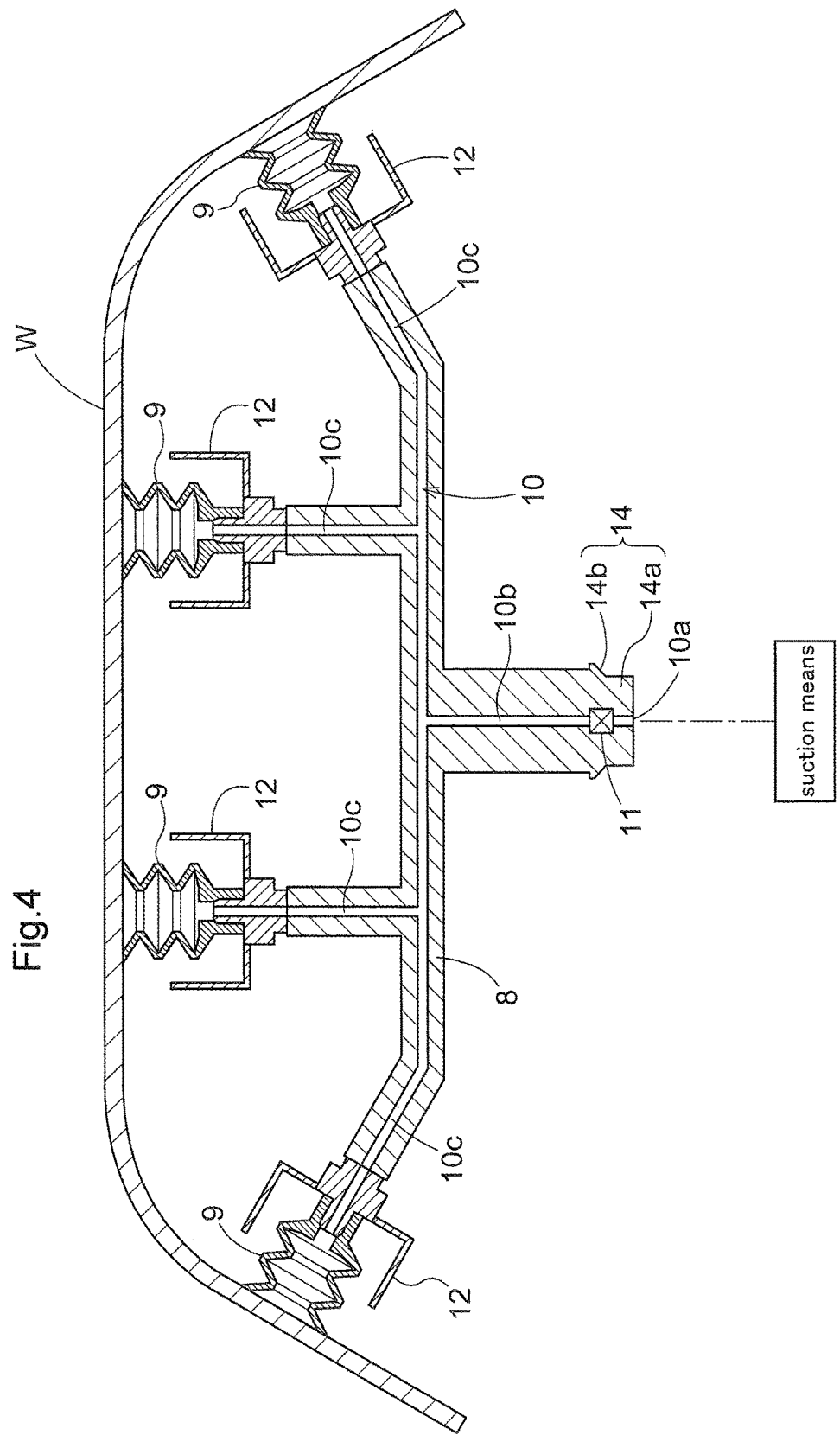

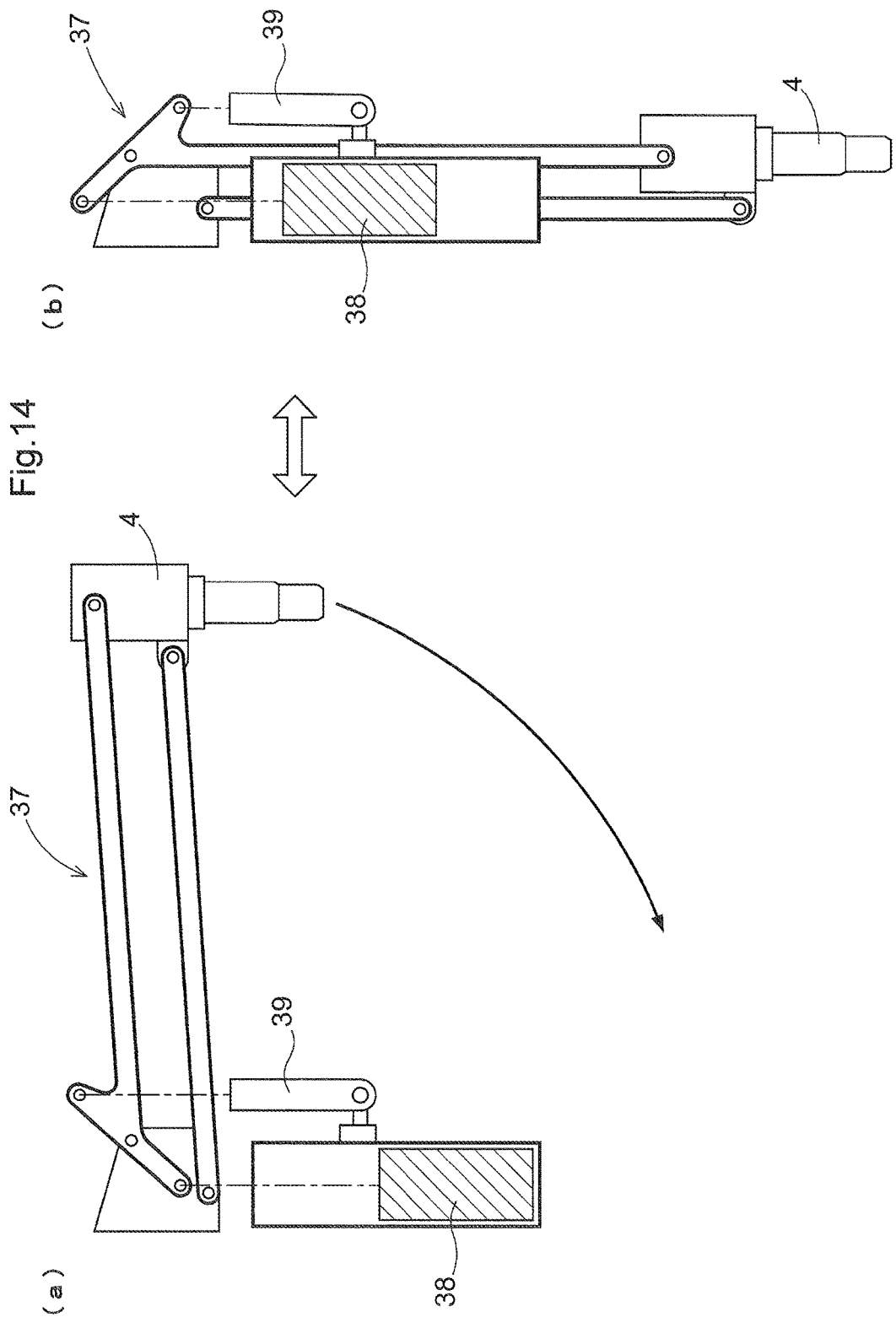

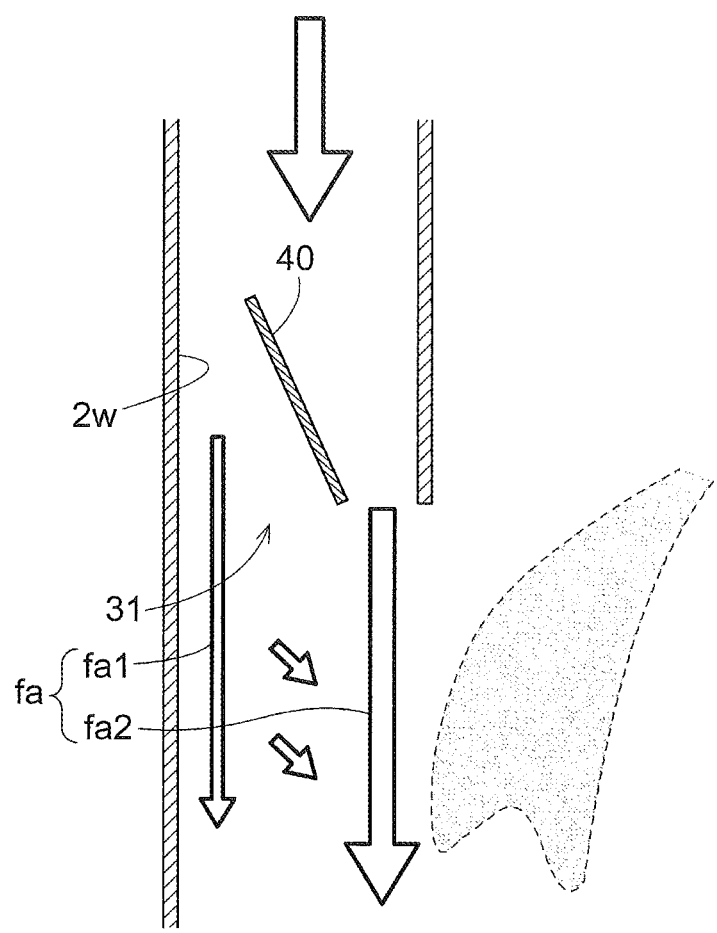

PAINTING FACILITY

CROSS-REFERENCE TO RELATED APPLICATIONS

This application is the United States national phase of International Application No. PCT/JP2015/060837 filed Apr. 7, 2015, and claims priority to Japanese Patent Application No. 2014-108140 filed May 26, 2014, the disclosures of which are hereby incorporated in their entirety by reference.

TECHNICAL FIELD

This invention relates to a painting facility.

In this painting facility, spraying means for spraying paint downwards is disposed at an upper portion of a painting area. Also, a painting robot installing area for installing a painting robot is disposed laterally adjacent the painting area. And, a painting object (i.e. an object to be painted) is painted by paint spraying from the spraying means while the painting object as being held to an arm leading end portion of the painting robot is being displaced downwardly of the spraying means relative to this spraying means, by an action of the spraying robot.

BACKGROUND ART

Conventionally, regarding a painting facility of the above-noted type, Patent Document 1 identified below discloses the following technical matters.

Paint is sprayed downwards from the spraying means disposed at the upper portion of the spraying area. Relative to this, ventilation air is discharged downwards to the painting area from more upward than the spraying means. With this, the spraying direction of paint from the spraying means is made in agreement with a direction of air flow of the ventilation air in the painting area.

Namely, with the painting facility disclosed in this Patent Document 1, by making the paint spraying direction from the spraying means in agreement with the air flow direction of the ventilation air in the painting area, in addition to the arrangement of spraying paint downward from the spraying means, the area of scattering of the sprayed paint is restricted.

PRIOR-ART DOCUMENT

Patent Document

Patent Document 1: Japanese Unexamined Patent Application Publication No. 2005-103446

SUMMARY

Problem to be Solved by Invention

However, with the painting facility disclosed in this Patent Document 1, although the scattering area of sprayed paint can be restricted, since painting operation is effected with displacing the painting object by an action of the painting robot while keeping this painting object held to the arm leading end portion of the painting robot, in comparison with a converse method of effecting painting with displacing the spraying means while keeping the painting object substantially fixed, the above arrangement would suffer a problem of an amount of adhesion of excess sprayed paint to the painting robot including its arm being increased rather than decreased.

In view of the above-described state of the art, a principal object of the present invention is to effectively prevent adhesion of excess sprayed paint to the painting robot which is holding the painting object, while employing the arrangement of displacing the painting object relative to the spraying means.

Solution to the Problem

A first characterizing feature of the present invention relates to a painting facility, and according to the feature, spraying means for spraying paint downward is disposed at an upper portion of a painting area;

a robot installing area for installing a painting robot is disposed laterally adjacent the painting area;

a painting object held to an arm leading end portion of the painting robot is painted by paint spraying from the spraying means while displacing the painting object relative to and downwardly of the spraying means by an action of the painting robot;

an air feeding opening for the robot installing area is provided for feeding ventilation air to the robot installing area; and by air feeding from the air feeding opening, the robot installing area is placed under a higher pressure than the painting area adjacent thereto, thereby to form an air flow which flows from the robot installing area into the painting area.

(Effect of Invention 1)

According to the above-described arrangement, the above-described air flow flows from the adjacent robot installing area into the painting area. Therefore, adhesion of excess sprayed paint to the painting robot body disposed in the robot installing area and also adhesion of excess sprayed paint to the arm of the painting robot which extends from the robot installing area to a position downwardly of the spraying means can be effectively prevented by this air flow.

A second characterizing feature of the present invention specifies a preferred embodiment of the first characterizing feature and according to this characterizing feature:

a painting area air feeding means for feeding ventilation air to an upper portion of the painting area and an air curtain air feeding opening for forming an air curtain which flows downward along a painting area lateral wall disposed opposite the adjacent robot installing area are provided at upper portions of the painting area; and downwardly of the painting area, there is formed an air discharging area for discharging downward air present inside the painting area.

(Effect of Invention 2)

According to the above-described arrangement, the air flow which has frown from the adjacent robot installing area into the painting area is discharged downwards from the painting area, together with the ventilation air fed by the painting area air feeding means to the upper portion of the painting area and the air curtain flow which flows downward along a painting area lateral wall disposed opposite the adjacent robot installing area.

And, in the painting area, the ventilation air fed by the painting area air feeding means to the upper portion of the painting area flows downwards. With this, excess sprayed paint from the spraying means will be discharged speedily downwards from the painting area.

Further, in the painting area lateral wall disposed opposite the adjacent robot installing area, although excess sprayed paint may come near this lateral wall under the effect of the air flow flowing from the robot installing area into the painting area, adhesion of such excess sprayed paint to this lateral wall can be effectively prevented by the air curtain which flows down along this lateral wall.

Namely, with this arrangement, not only the above-described prevention of excess paint to the painting robot, but also prevention of excess sprayed paint to the painting area lateral wall disposed opposite the robot installing area can be achieved. Therefore, in addition to the restriction of paint scattering area by the arrangement of displacing the painting object relative to the spraying means, the painting area can be made even smaller.

A third characterizing feature of the present invention specifies a preferred embodiment of the second characterizing feature and according to this characterizing feature:

as the painting area air feeding means, a sock filter for discharging the ventilation air fed therein through a circumferential portion thereof is disposed under a horizontal posture at an upper portion of the painting area.

(Effect of Invention 3)

According to the above-described arrangement, the arrangement requires only disposing a sock filter (a filter having a filtering cloth in a cylindrical form) under a horizontal posture at an upper portion of the painting area. Therefore, in comparison with an arrangement wherein a painting area air feeding chamber and a ceiling filter for discharging feeding for this air feeding chamber to the painting area are disposed over the entire area of the spraying area as seen in a plan view, the arrangement of the upper portion of the painting area can be made simple and also it becomes easier to secure a sufficient height dimension for the painting area.

A fourth characterizing feature of the present invention specifies a preferred embodiment of the third characterizing feature and according to this characterizing feature:

an air curtain air discharging box having the air curtain air feeding opening in a lower face portion thereof is disposed at an upper portion of the painting area in close vicinity of the painting area lateral wall; and a leading end portion of the sock filter is connected to and opened into the air curtain air discharging box.

(Effect of Invention 4)

According to the above-described arrangement, the sock filter employed as the painting area air feeding means for feeding ventilation air to the upper portion of the painting area is utilized as an air feeding duct for the air curtain air discharging box. Therefore, in comparison with an arrangement of providing an air feeding duct for the air curtain air discharging box separately of the sock filter, the facility configuration can be made even more simple. Further, it becomes even easier to secure a sufficient height dimension for the painting area.

A fifth characterizing feature of the present invention specifies a preferred embodiment of the fourth characterizing feature and according to this characterizing feature:

at a connection portion of the sock filter relative to the air curtain air discharging box, there is incorporated a throttle mechanism for restricting an amount of air which flows from the leading end portion of the sock filter into the air curtain air discharging box.

(Effect of Invention 5)

According to the above-described arrangement, the sock filter acting as the painting area air feeding means is utilized as an air feeding duct for the air curtain air discharging box.

Moreover, by adjusting an opening degree of the throttle mechanism (e.g. a throttle opening or an air amount adjusting damper), an air amount ratio between the ventilation air to be fed to the upper portion of the painting area from the circumferential portion of the sock filter and the amount of air which is to flow from the leading end portion of this sock filter into the air curtain air discharging box (that is, the air which forms the air curtain) can be adjusted in a reliable manner to a desired air amount ratio.

A sixth characterizing feature of the present invention specifies a preferred embodiment of the second characterizing feature and according to this characterizing feature:

the air curtain air feeding opening and the spraying means are disposed side by side coaxially in a juxtaposing direction of the painting area and the robot installing area as seen in a plan view; and a size of the air curtain air feeding opening in a spraying area width direction is set smaller than a size of the painting area lateral wall in the painting area width direction.

(Effect of Invention 6)

Of the painting area lateral wall disposed opposite the robot installing area, a portion vulnerable to a risk of adhesion of excess sprayed paint thereto from the spraying means can be limited by the restriction of the paint scattering area thanks to the arrangement of displacing the painting object relative to the spraying means rather than the other way around and the effect of air flow from the robot installing area into the painting area. Therefore, with this arrangement, paint adhesion can be prevented in a reliable manner by the air curtain which is formed by the air curtain air feeding opening.

And, while paint adhesion to the painting area lateral wall is prevented reliably, the air curtain air feeding opening can be made small, in comparison with e.g. an arrangement of providing such air curtain air feeding opening over the entire width of the painting area lateral wall. With this, the amount of air discharged from this air curtain air feeding opening can be made small. And, correspondingly therewith, the facility cost and running cost of the facility can be made lower.

A seventh characterizing feature of the present invention specifies a preferred embodiment of the second characterizing feature and according to this characterizing feature:

an over duct for feeding ventilation air to the air curtain air feeding opening is disposed at an upper portion of the painting area; and a lower wall of the over duct is provided with a porous structure as air feeding means for the painting area, so that a portion of ventilation air inside the over duct is fed and discharged through the porous structure to an upper portion of the painting area.

(Effect of Invention 7)

According to the above-described arrangement, an over duct for feeding ventilation air to the air curtain air feeding opening is utilized as painting area air feeding means. Namely, from the porous structure formed in the lower wall portion of this over duct, a portion of the ventilation air inside the over duct is discharged and fed to the upper portion of the painting area. Therefore, in comparison with an arrangement of providing such paint area air feeding means for feeding ventilation air to an upper portion of the painting area separately of the over duct, the configuration of the upper portion of the painting area can be made simple. Further, it becomes easier to secure a sufficient height dimension for the painting area.

An eighth characterizing feature of the present invention specifies a preferred embodiment of the second characterizing feature and according to this characterizing feature:

in each of opposed vertical corner portions of the painting area lateral wall disposed opposite the robot installing area, there is disposed a paint tank installing chamber having an approximately triangular cross sectional shape as viewed in a plan view; and the air curtain air feeding opening has a plan view shape which is a trapezoidal shape surrounded by the painting area lateral wall and chamber walls of the paint tank installing chambers.

(Effect of Invention 8)

According to the above-described arrangement, paint tank installing chambers are disposed with utilization of opposed vertical corner portions of the paint area lateral wall in the painting area. Therefore, in comparison with an arrangement of disposing paint tank installing chambers and the painting area separately, the facility configuration can be made compact.

Further, a plan view shape of the air curtain air feeding opening (i.e. the cross sectional shape of the air curtain) is set as a trapezoidal shape surrounded by the painting area lateral wall and chamber walls of the paint tank installing chambers. Therefore, adhesion of excess sprayed paint to the painting area lateral wall can be prevented reliably. And, adhesion of excess sprayed paint to the chamber walls of the paint tank installing chambers can be prevented reliably also.

A ninth characterizing feature of the present invention specifies a preferred embodiment of the first characterizing feature and according to this characterizing feature:

a controlling means is provided for automatically operating the painting robot according to a preset operational program; and the controlling means displaces the painting object relative to the spraying means while changing the posture of the painting object in such a manner as to maintain a painting object face in the painting object at each timing at a posture approximately perpendicular to the direction of paint spraying from the spraying means.

(Effect of Invention 9)

According to the above-described arrangement, a painting object face in the painting object at each timing (a face receiving paint spraying) is maintained at a posture approximately perpendicular to the direction of paint spraying from the spraying means. With this, paint applying efficiency of sprayed paint to the painting object can be enhanced and painting quality can be improved also.

Further, with the ability of enhancing the paint applying efficiency, scattering of excess sprayed paint can be restricted even more effectively. Thus, adhesion of excess sprayed paint to the painting robot or the painting area lateral wall can be prevented even more effectively also.

A tenth characterizing feature of the present invention specifies a preferred embodiment of the ninth characterizing feature and according to this characterizing feature:

a plurality of the painting areas are disposed side by side in a row, and in correspondence with these painting areas, a plurality of the robot installing areas are disposed side by side in a row in a painting area juxtaposing direction; and the controlling means is configured to send the painting object to the plurality of painting areas in series by way of transfer of the object between the painting robots installed in the respective adjacent robot installing areas.

(Effect of Invention 10)

According to the above-described arrangement, with utilization of the painting robot, the painting object is sent to the plurality of painting areas one after another by way of transfer thereof between the painting robots. Therefore, in comparison with an arrangement of providing a conveying means dedicated to the painting object such as a painting object conveyor or a painting object conveying robot, separately of the painting robot, the facility configuration can be made simple.

Incidentally, in implementing this arrangement, it is possible for the transfer of the painting object between painting robots to employ either a mode of implement in which a preceding painting robot causes the painting object after preceding painting to be held to the transfer section firstly and then a subsequent painting robot receives this painting object held to the transfer section prior to subsequent painting or a mode of implement in which the preceding painting robot directly transfers the painting object after the preceding painting to the subsequent painting robot.

An eleventh characterizing feature of the present invention specifies a preferred embodiment of the first characterizing feature and according to this characterizing feature:

a plurality of the painting areas are disposed side by side in a row, and in correspondence with these painting areas, a plurality of the robot installing areas are disposed side by side in a row in a painting area juxtaposing direction;

the adjacent painting areas are partitioned from each other by a partition wall, a hanging wall or an air curtain in the painting area juxtaposing direction; and the adjacent painting robot installing areas are either opened to each other in the painting area juxtaposing direction or partitioned from each other in the painting area juxtaposing direction.

(Effect of Invention 11)

According to the above-described arrangement, the adjacent painting areas are partitioned from each other by a partition wall, a hanging wall or an air curtain in the painting area juxtaposing direction. Therefore, a so-called "color overlap" due to movement of sprayed paint between the adjacent painting areas can be prevented effectively.

Further, the adjacent painting robot installing areas are either opened to each other in the painting area juxtaposing direction or partitioned, if needed, by the air curtain from each other in the painting area juxtaposing direction. Therefore, movement of the painting object between adjacent painting areas can be easily effected on the robot installing area side.

A twelfth characterizing feature of the present invention specifies a preferred embodiment of the second characterizing feature and according to this characterizing feature:

at an intermediate position in a direction of thickness of the air curtain which flows downwards along the painting area lateral wall disposed opposite the robot installing area, there is provided an air flow guiding face disposed under an inclined posture with an upper end thereof being closer to the painting area lateral wall than a lower end thereof.

(Effect of Invention 12)

According to the above-described arrangement, the air curtain air flow flowing downward along the painting area lateral wall disposed opposite the painting robot installing area is divided by the air flow guiding face into a low-speed air flow portion on a side near the painting area lateral wall and a high-speed air flow portion on a side distant from the painting area lateral wall.

And, due to the effect of the high-speed air flow portion on the side distant from the painting area lateral wall, there is generated an air flow component which moves from the low-speed air flow portion on the side near the painting area lateral wall toward the high-speed air flow portion on the side distant from the painting area lateral wall. With this, in comparison with an arrangement of causing an air curtain having a constant air flow rate to flow down along the painting area lateral wall, paint adhesion to the painting area lateral wall due to paint scattering from the inner side of the painting area can be prevented even more effectively.

A thirteenth characterizing feature of the present invention specifies a preferred embodiment of the first characterizing feature and according to this characterizing feature:

the spraying means is disposed in the painting area to be liftable up/down.

(Effect of Invention 13)

According to the above-described arrangement, at the time of painting, the spraying means is maintained at an elevated position. With this, downward paint spraying from the spraying means onto the painting object can be effected appropriately.

Further, at the time of maintenance, the spraying means is lowered. With this, maintenance for the spraying means can be carried out easily.

BRIEF DESCRIPTION OF THE DRAWINGS

FIG. 4 is an enlarged view of a holder,

FIG. 14 is a front view of a spraying means supporting arrangement showing a further embodiment, and FIG. 15 is a pattern diagram of an air curtain showing a further embodiment.

EMBODIMENTS

Figure 1:
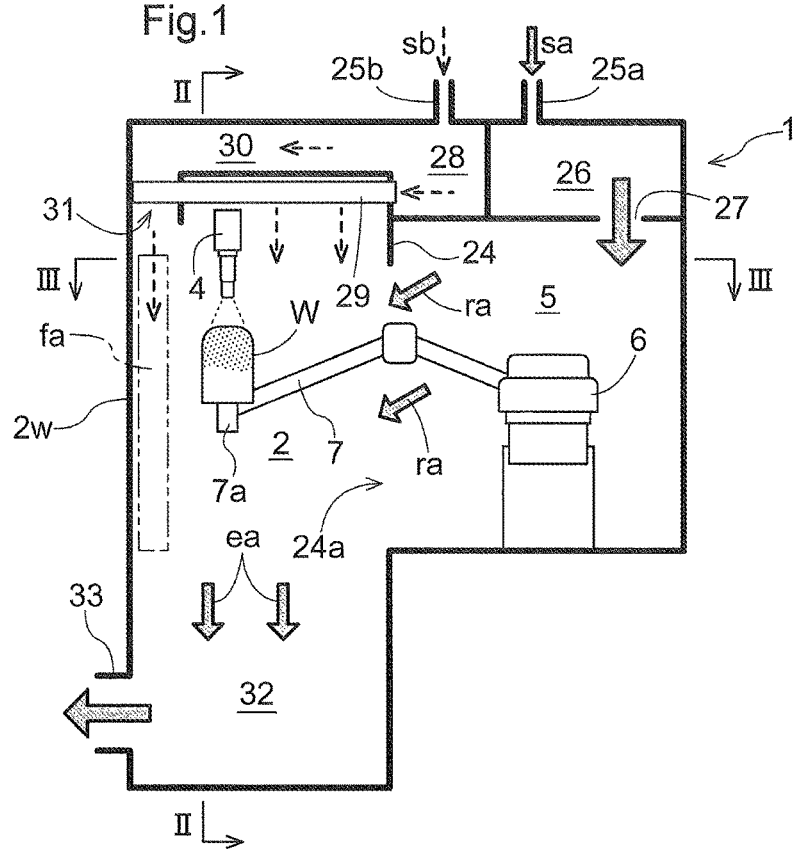
FIG. 1 is a front view of a painting booth.
Figure 2:
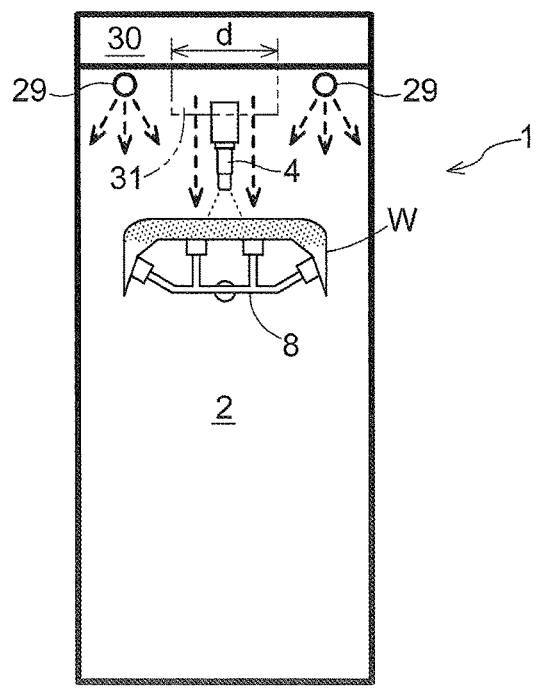
FIG. 2 is a sectional view taken along a line II-II in FIG. 1.
Figure 3:
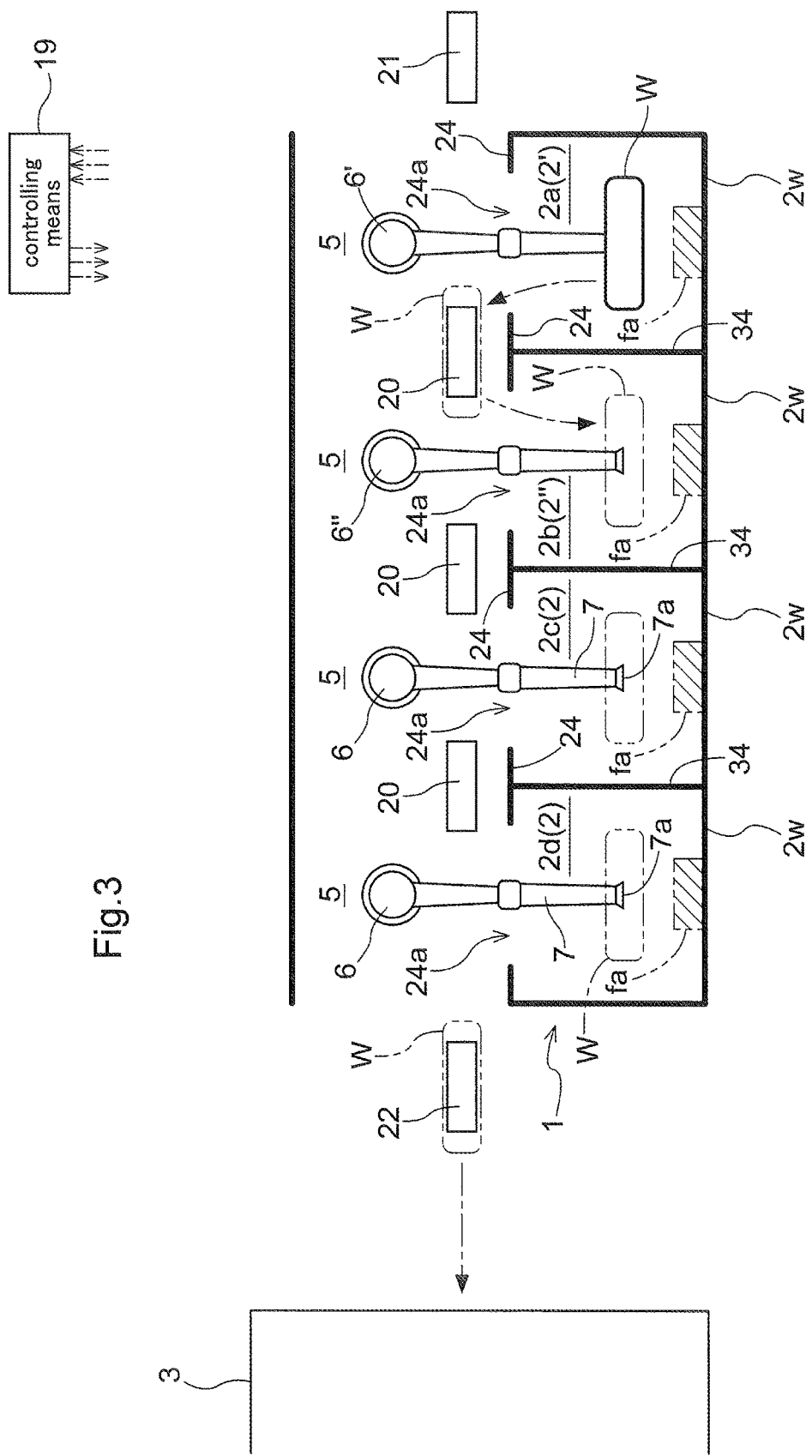
FIG. 3 is a sectional view taken along a line III-III in FIG. 1.

FIGS. 1-3 show a painting booth 1 for painting a painting object W (object to be painted) (a bumper of an automobile in this embodiment).

In this painting booth 1, for instance, four painting areas (=2a-2d) are disposed side by side in one row, and in these painting areas 2, the painting object W is painted in series.

For instance, in the first painting area 2a, primer painting is effected on the painting object W. Further, in the second painting area 2b, No. 1 base painting is effected on the painting object W after the primer painting. And, in the third painting area 2c, No. 2 base painting is effected on the painting object W after the No. 1 base painting.

And, in the fourth painting area 2d, clear painting is effected on the painting object W after the No. 2 base painting. The painting object W after completion of these painting operations is sent to a drying furnace 3 to receive a baking and drying treatment.

At an upper portion of each painting area 2, a spraying means 4 is disposed under a substantially perpendicularly downward orientation. This spraying means 4 sprays predetermined paint onto the painting object W.

On one lateral sides of the respective painting areas 2, robot installing areas 5 provided adjacent the respective painting areas 2 are disposed side by side along the spraying area juxtaposing direction. In these robot installing areas 5, there are respectively installed painting robots 6 for effecting painting operations in the corresponding painting areas 2.

Two painting areas 2 adjacent each other have a mutual relation of a preceding painting area 2' disposed on the upstream side in an advancing direction of the painting object W and a subsequent painting area 2" disposed on the downstream side in the advancing direction of the painting object W.

Specifically, the first painting area 2a is the preceding painting area 2' whereas the second painting area 2b is the subsequent painting area 2" relative thereto. Similarly, the second painting area 2b is the preceding painting area 2' whereas the third painting area 2c is the subsequent painting area 2" relative thereto. Further, the third painting area 2c is the preceding painting area 2' whereas the fourth painting area 2d is the subsequent painting area 2" relative thereto.

This preceding/subsequent relation applies also to the spraying means 4, the robot installing areas 5, and the painting robots 6, respectively.

In each painting area 2, the painting object W is held to a leading end portion 7a of an arm 7 of each painting robot 6 as being connected via a branch-like holder 8.

This holder 8, as shown in FIG. 4, includes a plurality of suckers 9 to be sucked to the painting object W as "a holder-painting object connecting means" for connecting this holder 8 to the painting object W.

These suckers 9 are provided in the holder 8 as being disposed in correspondence with a plurality of connection target positions in the painting object W (in this example, back face portions at the opposed ends at a front portion of the bumper and back face portions at opposed lateral portions of the bumper).

The holder 8 is formed of a pipe member. An inner hole of this pipe member (pipe hole) constitutes a suction passage 10 for sucking air inside the suckers 9 by a sucking means (not shown). By this suction of the inside air of the suckers 9 via the suction passage 10 by the sucking means, the suckers 9 are sucked to the painting object W, whereby the holder 8 is connected to the painting object W.

The suction passage 10 consists of a main suction passage 10b continuous to a suction opening 10a connected to the sucking means and branch suction passages 10c branching from the main suction passage 10b and opening to the insides of the respective suckers 9.

The main suction passage 10b incorporates a check valve 11 of e.g. a ball type. This check valve 11 of a ball type or the like allows flow of air from the inside of each sucker 9 toward the suction opening 10a (namely, air suction by the sucking means connected to the suction opening 10a). And, this ball-type or the like check valve 11 automatically shuts off reverse air flow (i.e. air flow from the suction opening 10a toward the inside of each sucker 9).

Namely, with air suction by the sucking means, each sucker 9 is sucked to the painting object W. Thereafter, even after the sucking means is detached from the suction opening 10a, reverse air flow (in other words, opening-up of each sucker 9 to the atmosphere) is prevented by this check valve 11. Therefore, the sucked state of each sucker 9 to the painting object W is maintained. With this, the connection between the holder 8 and the painting object W is maintained.

The holder 8 includes covers 12 for the respective suckers 9. When the sucker 9 is under a non-sucked expanded state, a leading end sucking portion of the sucker 9 protrudes from the covering area of the cover 12. Conversely, when the sucker 9 is under a sucked contracted state, the leading end sucking portion of the sucker 9 is retracted toward the inner side of the covering area of the cover 12.

Namely, with provision of this cover 12, it is possible to effectively prevent adherence of excess sprayed paint to the sucker 9 while allowing suction of the sucker 9 to the painting object W.

Figure 5A:
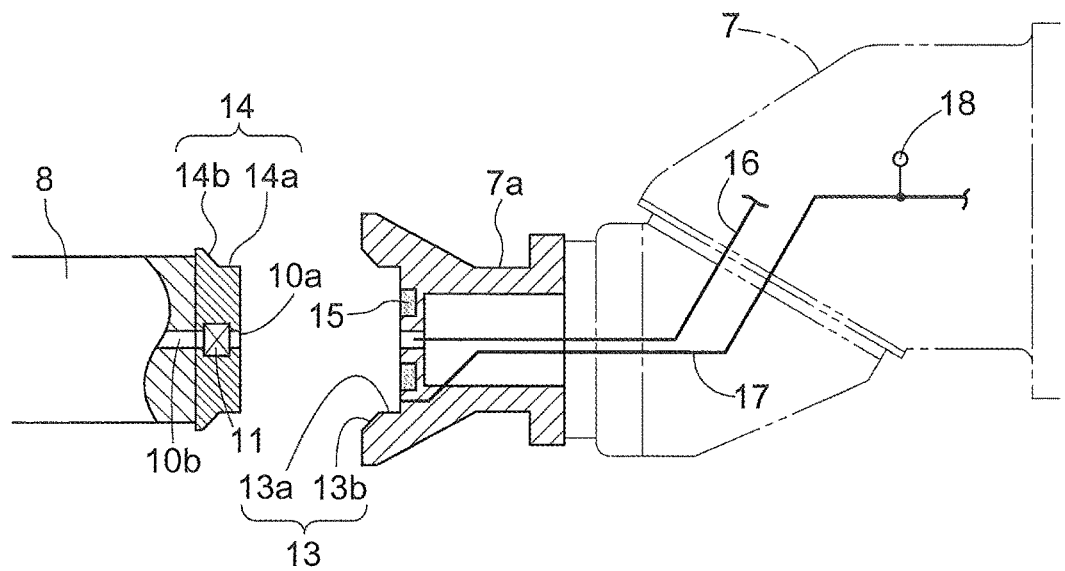
FIGS. 5A and 5B are enlarged sectional views showing a connection arrangement between an arm leading end portion and the holder.
Figure 5B:
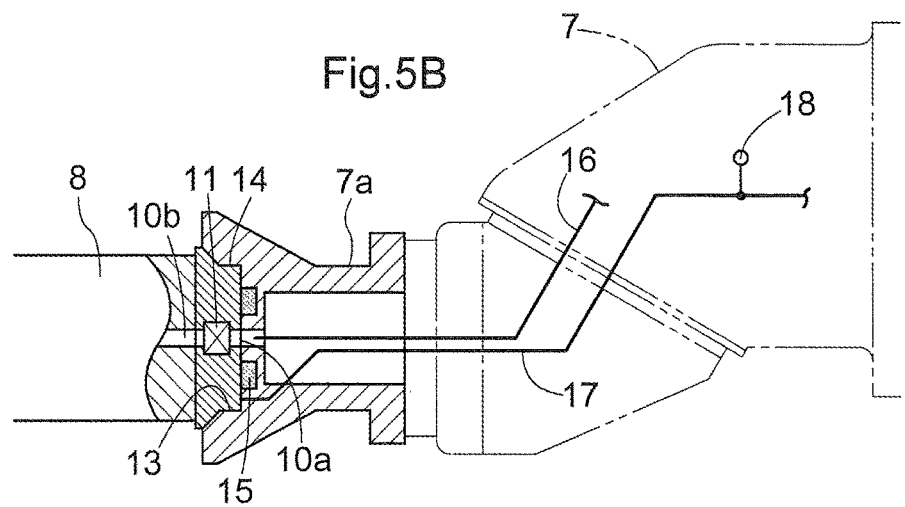

On the other hand, as an "arm-holder connecting means" for connecting the arm leading end portion 7a of each painting robot 6 to the holder 8, as shown in FIG. 5, a connection hole 13 is provided in the arm leading end portion 7a of the respective painting robot 6, and in correspondence with this connection hole 13, a connection projection 14 to be inserted and fitted into the connection hole 13 is formed on the holder 8.

In the connection hole 13 of each arm leading end portion 7a, there are formed coaxially a straight hole portion 13a having a cylindrical inner circumferential face and a tapered entrance portion 13b having a tapered inner circumferential face whose diameter progressively increases toward a hole entrance.

On the other hand, in the connection projection 14 of the holder 8, there are formed coaxially a column-like leading end portion 14a to be fitted into the straight hole portion 13a of the connection hole 13 and a tapered stepped portion 14b to be fitted into the tapered entrance portion 13b of the connection hole 13.

Namely, when the connection projection 14 of the holder 8 is to be inserted and fitted into the connection hole 13 of the respective arm leading end portion 7a, the column-like leading end portion 14a of the connection projection 14 will be brought into sliding contact with the tapered inner circumferential face of the tapered entrance portion 13ab of the connection hole 13, whereby the connection projection 14 can be guided to the center of the connection hole 13 smoothly.

And, with completion of the above insertion fitting, a column-like outer circumferential face of the column-like leading end portion 14a of the connection projection 14 is brought into face contact with the cylindrical inner circumferential face of the straight hole portion 13a of the connection hole 13. Also, a tapered outer circumferential face of the tapered stepped portion 14b of the connection projection 14 is brought into face contact with the tapered inner circumferential face of the tapered entrance portion 13b of the connection hole 13.

With the above, the arm leading end portion 7a of the respective painting robot 6 is connected to the holder 8 with high connection accuracy in a reliable manner.

Incidentally, the suction opening 10a of the suction passage 10 in the holder 8 opens in a connection joint face between the arm leading end portion 7a and the holder 8 (specifically, the leading end face portion of the connection projection 14).

In the connection hole 13 of the respective arm leading end portion 7a, a permanent magnet 15 is provided. This permanent magnet 15 provides a magnetic sucking action to the connection projection 14 of the holder 8 as being inserted/fitted into the connection hole 13.

In the connection hole 13 of the respective arm leading end portion 7a, an arm side suction passage 16 is opened. This arm side suction passage 16 provides an air suction force between the connection hole 13 and the connection projection 14 inserted/fitted therein.

Namely, with the magnetic force from the permanent magnet 15 together with the air suction force applied via the arm side suction passage 16, the inserted/fitted state between the insertion hole 13 and the connection projection 14 is maintained. With this, the connection between the arm leading end portion 7a of the respective painting robot 6 and the holder 8 is maintained.

In the connection hole 13 of the respective arm leading end portion 7a, separately from the arm side suction passage 16 for the holder connection, a detection air passage 17 is formed. This detection air passage 17 is opened in the inner face of the connection hole 13 which constitutes "a connection joint face" between the arm leading end portion 7a and the holder 8.

Therefore, this detection air passage 17 is closed upon establishment of connection between the arm leading end portion 7a and the holder 8 (that is, insertion/fitting of the connection projection 14 into the connection hole 13).

Each painting robot 6 mounts a pressure applying means (not shown). This pressure applying means applies a predetermined positive pressure by supply of compressed air to the detection air passage 17 which is now closed in association with the establishment of connection between the arm leading end portion 7a and the holder 8.

The respective painting robot 6 also mounts a pressure detecting means 18. This pressure detecting means 18 detects air pressure in the detection air passage 17.

Namely, when a certain abnormality occurs in the connection between the respective arm leading end portion 7a of the respective painting robot 6 and the holder 8 or an abnormal external force is applied to the holder due to e.g. accidental collision between the panting object W or the holder 8 with another object, there occurs reduction in the applied pressure in the detection air passage 17 due to opening of the detection air passage 17 associated therewith.

As this reduction of applied pressure is detected by the pressure detecting means 18, the connection abnormality or abnormal external force is detected.

And, when abnormality is detected by this pressure detecting means 18, a controlling means 19 executes a predetermined safety measure such as emergency stop of movements of the respective painting robot 6 or issuance of an alarm.

Incidentally, in the inner face of the connection hole 13 and at the opening of the detection air passage 17, there is provided a ring-shaped seal (not shown) for surrounding this opening. This seal partitions between an area where air suction force is applied via the arm side suction passage 16 and an area where the positive pressure is applied via the detection air passage 17.

The controlling means 19 automatically operates the respective painting robot 6 according to a preset operational program.

In each painting area 2, as described above, the painting object W is connected via the holder 8 to the arm leading end portion 7a of the respective painting robot 6. Under this state, with an automatic action of the painting robots 6, the painting object W is painted by downward paint spraying from the spraying means 4 while this painting object W is being displaced relative to the spraying means 4.

In the course of the above-described painting, the controlling means 19 displaces the painting object W relative to the spraying means 4 while changing the posture of the painting object W in such a manner as to maintain a painting object face in the painting object W at each timing at a posture approximately perpendicular to the direction of paint spraying from the spraying means 4.

At a border between adjacent robot installing areas 5 and between the respective painting robots 6, a transfer section 20 is provided. In this transfer section 20, reception and transfer of the painting object W between the adjacent painting robots 6 are effected.

Namely, the painting object W after completion of painting in the preceding painting area 2' is sent via this transfer section 20 to the subsequent painting area 2".

More particularly, according to the controlling means 19, after completion of the preceding painting in the preceding painting area 2', the painting object W together with the holder 8 is held to the transfer section 20 between the preceding painting robot 6' and the subsequent painting robot 6", by an action of the preceding painting robot 6'.

Then, while the connection between the painting object W and the holder 8 is being maintained, the connection between the arm leading end portion 7a of the preceding painting robot 6' and the holder 8 is released.

In succession, the arm leading end portion 7a of the preceding painting robot 6' is retracted away from the transfer section 20. Thereafter, with an action of the subsequent painting robot 6", the arm leading end portion 7a of this subsequent painting robot 6" is connected to the holder 8 which is being supported to the transfer section 20, with its connection to the painting object W being maintained. Then, the process shifts to a subsequent painting in the subsequent painting area 2".

Incidentally, at the arm leading end portion 7a of each painting robot 6, there is mounted a connection releasing means (not shown).

This connection releasing means, when the air suction via the arm side suction passage 16 for holder connection is stopped, removes the connection projection 14 away from the connection hole 13 against the magnetic force of the permanent magnet 15, thereby to release the connection between the arm leading end portion 7a and the holder 8.

That is, the controlling means 19 stops the air suction via the arm side suction passage 16 and automatically operates the connection releasing means, thereby to release the connection the arm leading end portion 7a of the preceding painting robot 6' and the holder 8 in the transfer section 20.

Incidentally, the painting object W connected with the holder 8 in advance and introduced into the first painting area 2a will be caused to be held to the transfer section 21 adjacent the first painting area 2a by an operator or another robot.

On the other hand, by an action of the painting robot 6 for the first painting area 2a, the arm leading portion 7a of this painting robot 6 with its connection to the painting object W maintained will be connected to the holder 8 held to the transfer section 21, with its connection to the painting object W being maintained. And, the process shifts to the painting in the first painting area 2a.

Further, the painting object W after completion of its painting in the last fourth painting area 2d is mounted together with the holder 8 on a transport cart 22 in the vicinity of the fourth painting area 2d, by an action of the painting robot 6 for this fourth painting area 2d. Then, the connection between the arm leading end portion 7a of the painting robot 6 and the holder 8 is released. Thereafter, the painting object W, together with the holder 8 and the transport cart 22, will be sent into a drying furnace 3.

In the above, the painting object W is softened by heat environment in the drying furnace 3. To this, by opening up the inside negative pressure of each sucker 9 of the holder 8 to the atmosphere, deformation of sucker suction portions in the painting object W is prevented (incidentally, when needed, abnormal contraction of the sucker 9 in the drying furnace can be prevented also by this opening to the atmosphere).

Between each painting area 2 and each robot installing area 5 correspondingly adjacent thereto, there is provided a partition wall 24. In this partition wall 24, there is defined a work opening 24a that allows the arm 7 of the painting robot 6 installed in the robot installing area 5 to extend into the corresponding painting area 2.

Further, at a ceiling bosom portion of the respective robot installing are 5, there is provided an air feeding chamber 26 for robot installing area. This air feeding chamber 26 for robot installing area receives ventilation air (sa) fed from a ventilation machine (not show) through an air feeding passage 25a for robot installing area.

In a ceiling portion of each robot installing area 5 acting also as a lower wall of this air feeding chamber 26, an air feeding opening 27 is provided. This air feeding opening 27 blows the ventilation air (sa) received into the air feeding chamber 26 out into the respective robot installing area 5.

On the other hand, at a painting area side portion of the ceiling bosom portion of each robot installing area 5, an air feeding chamber 28 for the painting area is provided. This painting area air feeding chamber 28 receives ventilation air (sb) fed from the air ventilation machine via a painting area air feeding passage 25b.

Incidentally, it is also possible to arrange such that fresh ventilation air is fed to one of the painting area air feeding chamber 28 and the robot installing area air feeding chamber 26 and to feed recycled air obtained by purifying exhaust air from the painting area 2 as ventilation air to the other of the same.

Further, in case same ventilation air (sa=sb) is fed to the painting area 2 and the robot installing area 5, the painting area air feeding passage 25b and the robot installing area air feeding passage 25a can be provided as a single co-acting air feeding passage and also the painting area air feeding chamber 28 and the robot installing area air feeding chamber 26 can be provided as a single co-acting air feeding chamber.

Further, there are provided two sock filters 29 (cylindrical filters) which extend from the painting area air feeding chamber 28 to one lateral wall 2w (the painting area lateral wall disposed opposite the robot installing area 5) of each painting area 2. These sock filters 29 are arranged such that the spraying means 4 is disposed at the center portion between these sock filters 29 as viewed in a plan view.

That is, in each painting area 2, the ventilation air (sb) received in the painting area air feeding chamber 28 is fed to upper portions of the respective painting area 2 via these two sock filters 29.

At an upper portion of each painting area 2 and upwardly of the two sock filters 29, an over duct 30 is provided. This over duct 30 has a duct width extending over the substantially entire region of the respective painting area 2 as seen in the plan view and extends from the painting area air feeding chamber 28 to the one lateral wall 2w of the respective painting area 2.

In a bottom face at a leading end portion of this over duct 30, there is formed an air feeding opening 31 for air curtain. This air curtain air feeding opening 31 forms an air curtain (fa) which flows downward along the one lateral wall 2w of the respective painting area 2.

More particularly, a portion of the ventilation air received in the painting area air feeding chamber 28 is blown down from the air curtain air feeding opening 31 via the over duct 30. With this, there is formed the air curtain (fa) which flows down along the one lateral wall 2w of the respective painting area 2.

The air curtain air feeding opening 31 and the spraying means 4 are disposed side by side coaxially as viewed in a plan view in the juxtaposing direction of the painting area 2 and the robot installing area 5.

Further, the width size (d) of the air curtain air feeding opening 31 (in other words, the width size of the air curtain (fa)) is smaller than the width size of the painting area one lateral wall 2w and is also smaller than a spacing distance between the two sock filters 29.

Downwardly of each painting area 2, there is formed an air discharging area 32. This air discharging area 32 receives air (ea) discharged downward from the painting area 2 in association with air feeding to the painting area 2 and air feeding to the corresponding robot installing area 5. And, the air (ea) received in this air discharging area 32 is discharged by an air discharging fan (not shown) via an air discharging passage 33.

Incidentally, if excess sprayed paint contained in the discharge air (ea) from the painting area 2 is to be collected by dry type collection technique, in the air discharging area 32, the discharge air (ea) will be mixed with a powder-like collection aiding substance and on the downstream side of the air discharging passage 33, the excess sprayed paint together with the collection aiding substance may be collected by a filter.

Also, if excess sprayed paint contained in the discharge air (ea) from the painting area 2 is to be collected by wet type collection technique, a wet type collection device for excess sprayed paint may be disposed in the air discharging area 32.

Therefore, each robot installing area 5 is maintained at a higher pressure than the adjacent painting area 2. From these robot installing areas 5, there will be formed a horizontal or obliquely downward air flow (ra) flowing into the corresponding painting area 2 through the work opening 24a defined in the partition wall 24.

With this air flow (ra), scattering of excess sprayed paint toward the robot installing area 5 will be prevented in the respective painting area 2.

Namely, in addition to the restriction of paint scattering by the downward paint spraying of the spraying means 4, as scattering of excess sprayed paint toward the robot installing area 5 by the above-described air flow (ra), adhesion of excess sprayed paint to the main body of the spraying robot 6 and adhesion of excess sprayed paint to the arm 7 of the painting robot 6 can be prevented effectively.

Further, with formation of the air curtain (fa) flowing downward along the one lateral wall 2w of the respective painting area 2, excess sprayed paint flowing toward the one lateral wall 2w of the painting area 2 will be entrapped by the air curtain (fa). With this, adhesion of excess sprayed paint to the one lateral wall 2w of the respective painting area 2 too can be prevented in a reliable manner.

That is, as paint scattering is restricted by the downward paint spraying by the spraying means 4 as described above, the extending width of the excess sprayed paint toward the one lateral wall 2w of the painting area 2 too can be restricted small. For this reason, even when the air curtain (fa) has only a small width size (d), the paint adhesion of the one lateral wall 2w of the respective painting area 2 can be prevented effectively.

Incidentally, adjacent painting areas 2 are partitioned from each other by the partition wall 34 or a hanging wall or air curtain. With this arrangement, relative movement of excess sprayed paint between adjacent painting areas 2 (i.e. between the preceding painting area 2' and the subsequent painting area 2") is prevented.

On the other hand, adjacent robot installing areas 5 are either kept open to each other or partitioned, if any, by an air curtain, from each other. With this arrangement, reception and transfer of the painting object W via the transfer section 20 between the adjacent robot installing areas 5 (i.e. between the preceding painting robot 6' and the subsequent painting robot 6") is made easy.

OTHER EMBODIMENTS

Next, other embodiments of the present invention will be described one by one.

The transfer section 20 used for holding the painting object W as being connected to the holder 8 is not limited to the type configured to hold the painting object W and the holder 8 as being mounted thereon. Alternatively, this transfer section 20 can be configured as a type holding the painting object W and the holder 8 as being hung therefrom. Namely, in embodying the present invention, the manner of holding the painting object W in the transfer section 20 can vary in many ways.

Further, regarding transfer of the painting object W between the painting robots 6, the mode of its implementing is not limited to the one in which the preceding painting robot 6' causes the painting object W after the preceding painting to be held to the transfer section 20 firstly and then the subsequent painting robot 6" receives this painting object W held to the transfer section 20 prior to the subsequent painting. Alternatively, it is also possible to employ a mode of implement in which the preceding painting robot 6' directly transfers the painting object W after the preceding painting to the subsequent painting robot 6".

The spraying means 4 disposed at an upper portion in the painting area 2 is not limited to the one which sprays paint perpendicularly downwards. This spraying means 4 can spray paint obliquely downward or horizontally. Further, this spraying means 4 can be configured to be capable of changing its spraying direction within a downward range.

A plurality of spraying means 4 can be installed in the preceding painting area 2' or the subsequent painting area 2". These multiple spraying means 4 will be selectively used, depending on the kind of the painting object W or the kind of the sprayed paint.

The specific shape and configuration of the holder 8 used for connection between the arm leading end portion 7a of the painting robot 6 and the painting object W can vary in any ways.

Further, the specific shape and configuration of the arm-holder connecting means for connecting the arm leading end portion 7a of the painting robot 6 to the holder 8 and the specific shape and configuration of the holder-painting object connecting means for connecting the holder 8 to the painting object W are not limited to those shown in the foregoing embodiment, but can vary in any ways.

Figure 6:
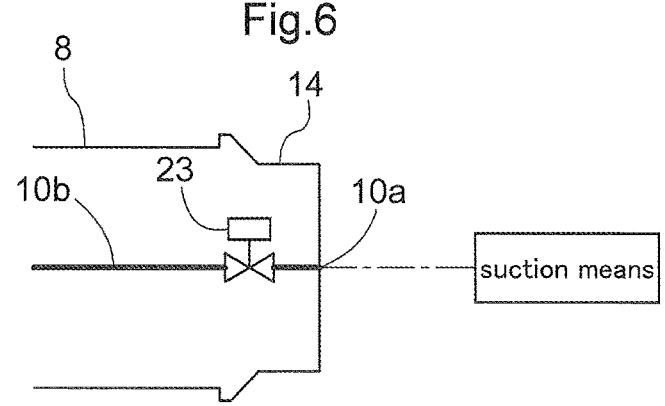
FIG. 6 is an enlarged view of a holder showing a further embodiment.

In the foregoing embodiment, there was shown an arrangement in which the sucked state of the sucker 9 to the painting object W is maintained by blocking the air flow toward the inside of the sucker 9 by the check valve 11. However, instead of this check valve, as shown in FIG. 6, an opening/closing valve 23 may be incorporated in the main suction passage 10b of the holder 8, for instance.

Namely, when the sucker 9 is to be held under a sucked state to the painting object W, this opening/closing valve 23 will be closed in response to a command via a wireless signal from the controlling means 19, for instance.

On the other hand, when the sucker 9 is to be sucked to the painting object W by suction of the air inside the sucker 9 by the sucking means or the sucked state of the sucker 9 to the painting object W is to be released by opening up the inside of the sucker 9 to the atmosphere, this opening/closing valve 23 will be opened in response to a command via a wireless signal from the controlling means 19, for instance.

Further, in the foregoing embodiment, the sucking means (not shown) is connected to the suction opening 10a of the suction passage 10 only when the sucker 9 is to be sucked to the painting object W by suction of the inside air of the sucker 9. Instead of this, the sucker 9 may be sucked to the painting object W by suction of the inside air of the sucker 9 with utilization of air suction force applied through the arm side suction passage 16 which maintains the connection between the arm leading end portion 7a and the holder 8.

Figure 7:
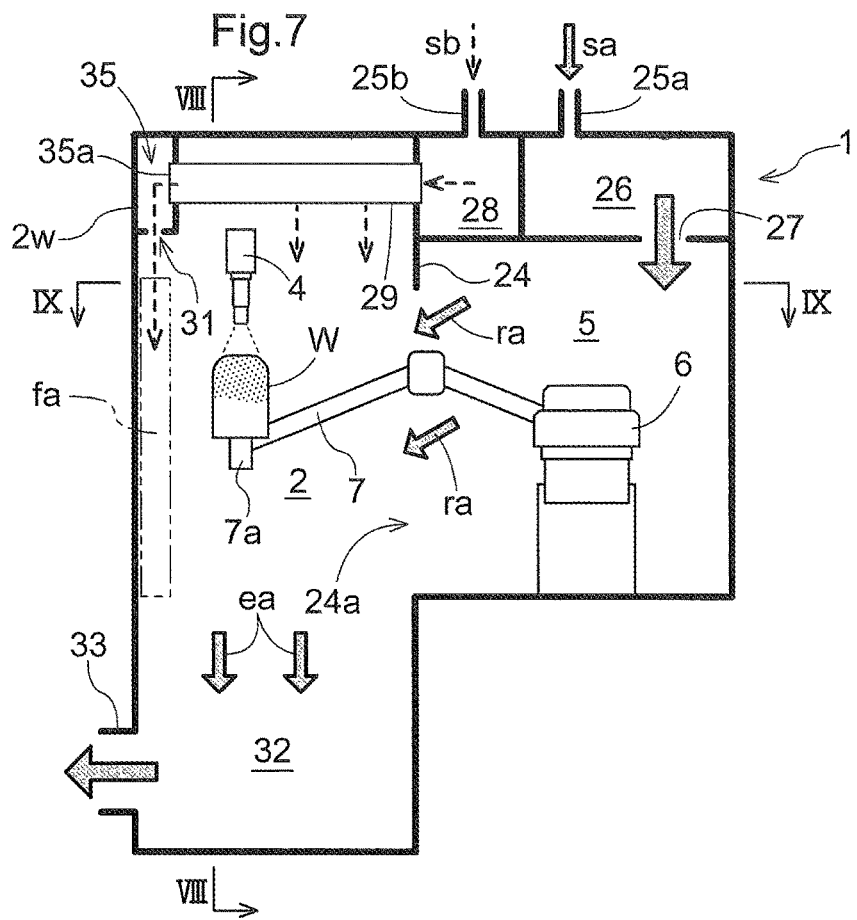
FIG. 7 is a front view of a painting booth showing a further embodiment.
Figure 8:
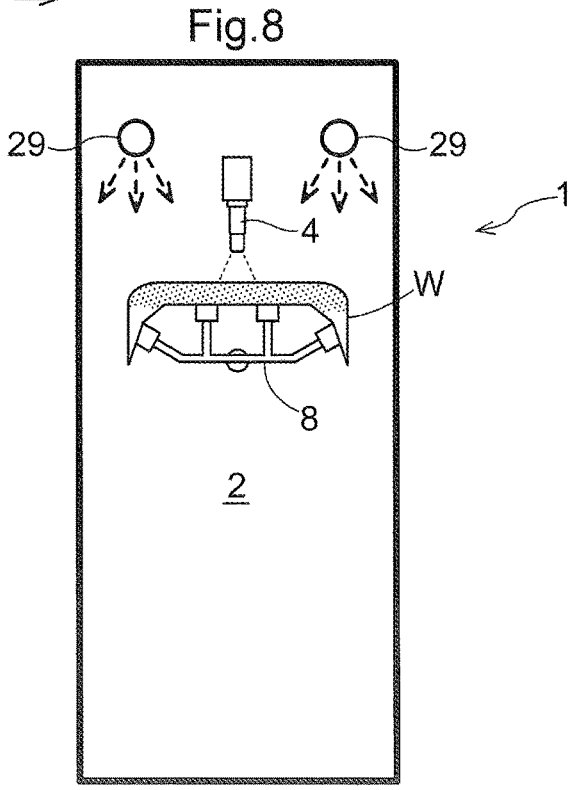
FIG. 8 is a sectional view taken along a line VIII-VIII in FIG. 7.
Figure 9:
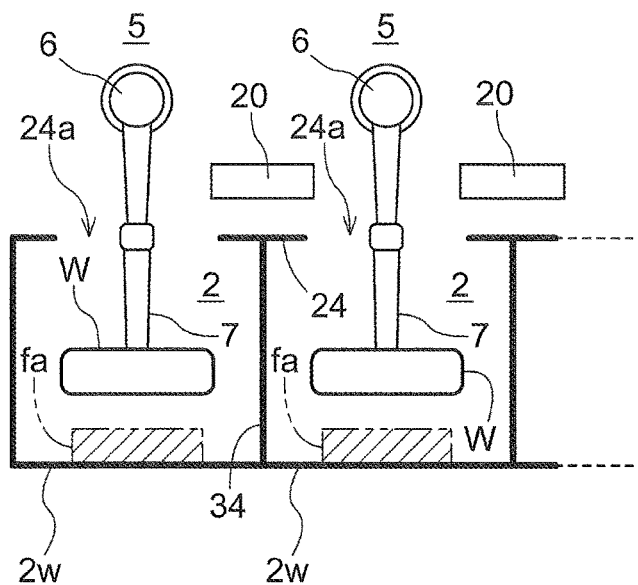
FIG. 9 is a sectional view taken along a line IX-IX in FIG. 7.

The air feeding arrangement for the respective painting area 2 can be arrangements shown in FIGS. 7-9.

Namely, a nozzle (air discharging) box 35 for air-curtain defining an air-curtain air feeding opening 31 in a lower face thereof is disposed at an upper portion of the one lateral wall 2w of each painting area 2.

And, the two sock filters 29 which extend from the painting area air feeding chamber 28 are caused to extend to the lateral face of the air-curtain nozzle box 35. And, the leading end portions of these sock filter 29 are opened to the inside of the air-curtain nozzle box 35 via a throttle mechanism 35a such as a a throttle opening, an air amount damper, etc.

Namely, with this air feeding arrangement, in parallel with feeding of a portion of the ventilation air (sb) received in the painting area air feeding chamber 28 via the two sock filters 29 to the upper portion of the respective painting area 2, the other portion of the ventilation air (sb) received in the painting area air feeding chamber 28 is fed via the two sock filter 29 to the air-curtain nozzle box 35.

With the above, as air is discharged from the air-curtain air feeding opening 31, there is formed an air curtain (fa) which extends along the one lateral wall 2w of the painting area 2.

Figure 10:
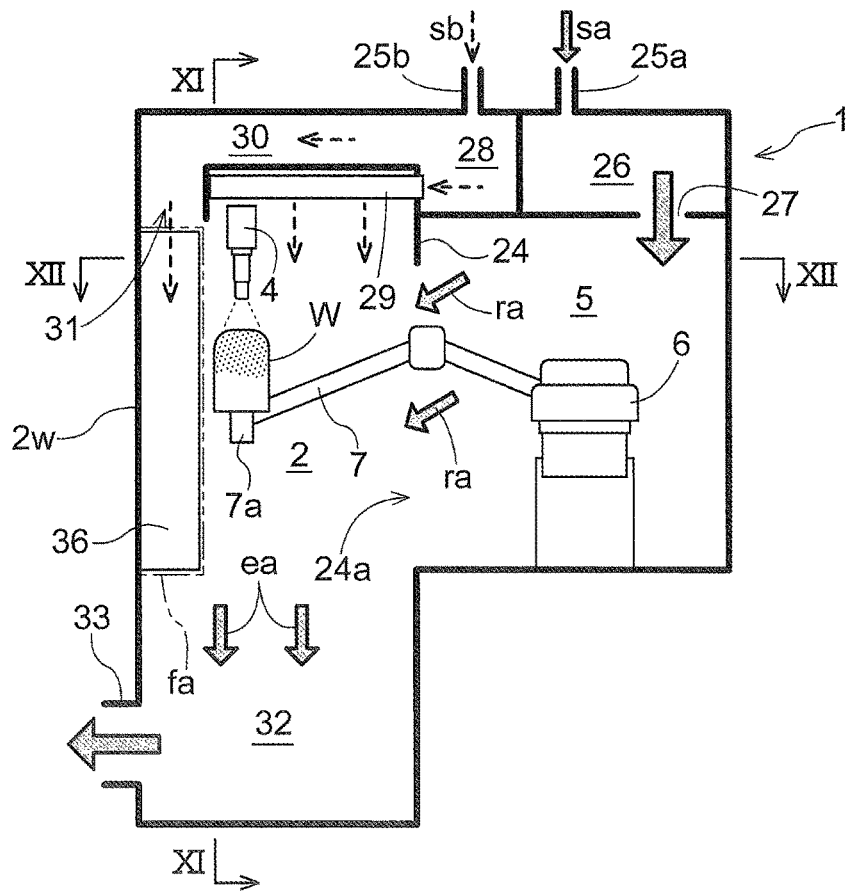
FIG. 10 is a front view of a painting booth showing a further embodiment.
Figure 11:
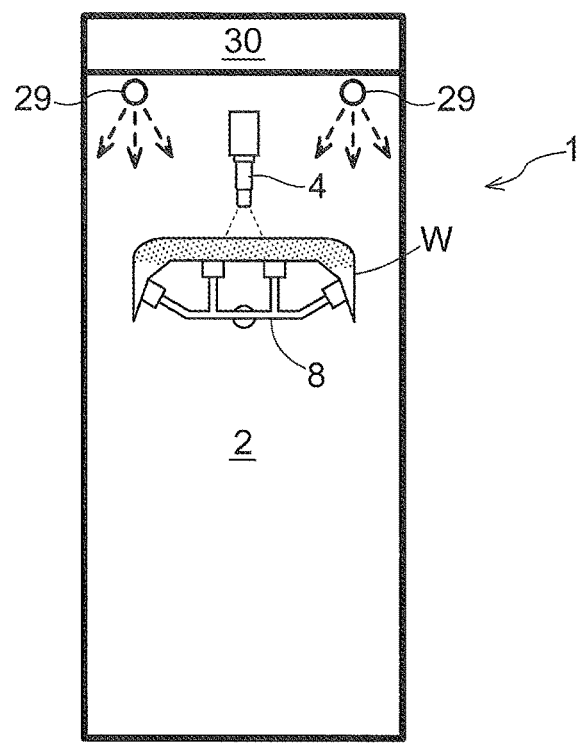
FIG. 11 is a sectional view taken along a line XI-XI in FIG. 10.
Figure 12:
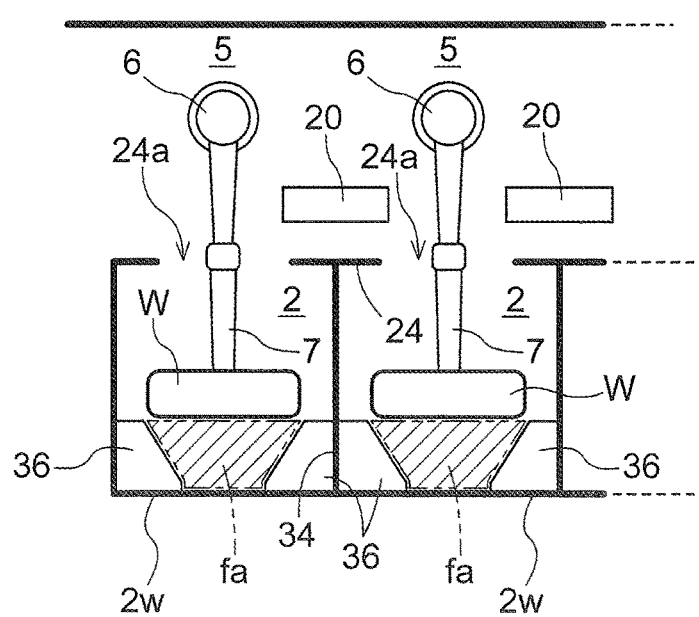
FIG. 12 is a sectional view taken along a line XII-XII in FIG. 10.

The air feeding arrangement for the respective painting area 2 can be arrangements shown in FIGS. 10-12.

Namely, on opposed end corner portions of the one lateral wall 2w of each painting area 2, there are formed paint tank installing chambers 36 which extend along the entire height of the painting area 2. The cross sectional shape of these paint tank installing chambers 36 as seen in a plan view is set as an approximately triangular shape which is contained within the opposed end corner portions of the one lateral wall 2w of the painting area 2.

And, the plan-view shape of the air-curtain air feeding opening 31 (namely, the plan view cross sectional shape of the air curtain (fa)) is set as a trapezoidal shape surrounded by the bottom side of the triangular cross sectional shape of these paint tank installing chambers 36 and the one lateral wall 2w of the painting area 2.

Namely, with this air feeding arrangement, thanks to the air curtain (fa), it is possible to prevent adhesion of excess sprayed paint to the one lateral wall 2w of the painting area 2, but also adhesion of excess sprayed paint to the chamber walls of the paint tank installing chambers 36.

Figure 13:
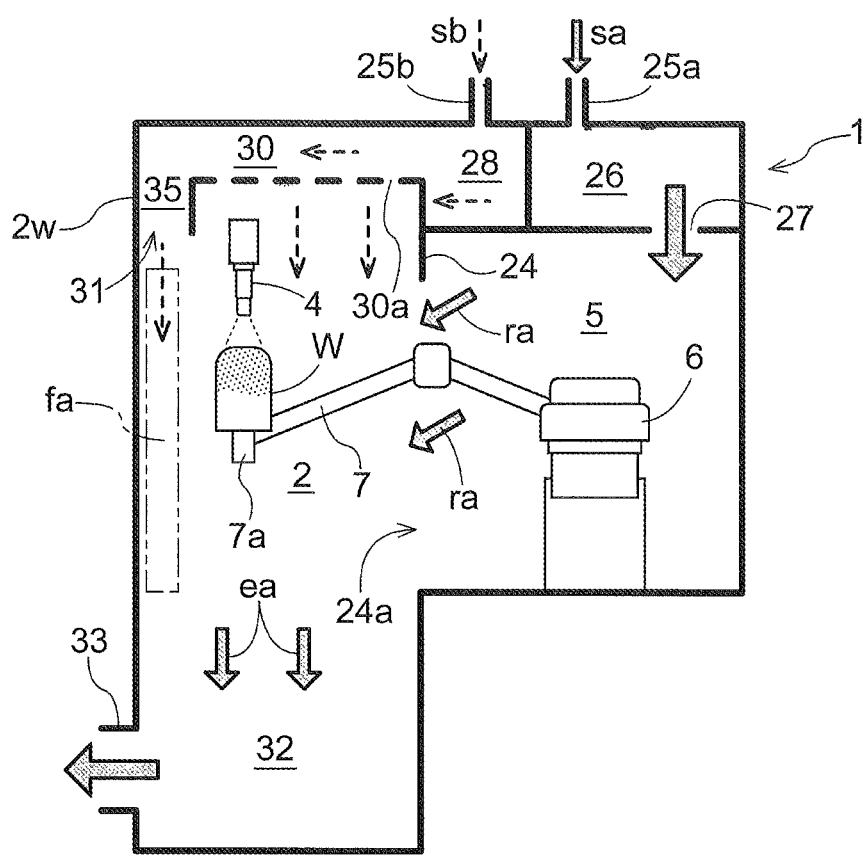
FIG. 13 is a front view of a painting booth showing a further embodiment.

The air feeding arrangement for the respective painting area 2 can be an arrangement shown in FIG. 13.

Namely, a lower wall 30a of the over duct 30 provided at the upper portion of the respective painting area 2 is provided with a porous structure by means of a punching plate, a filter or the like. With this, the sock filters 29 are omitted and the ventilation air (sb) is discharged and fed to the upper portion of the painting area 2 via the lower wall porous structure of the over duct 30.

The painting robot 6 to be installed in the respective robot installing area 5 is not limited to the floor mount type. The painting robot 6 to be installed in the respective robot installing area 5 can be any installment type such as a wall hung type or ceiling suspended type, etc.

Further, the spraying means 4 can be disposed to be liftable up/down in the painting area 2. With this, maintenance for the spraying means 4 can be carried out easily.

And, in this case, as shown in FIG. 14 for example, a downwardly directed spraying means 4 will be attached to a pivot end of a parallel link mechanism 37 which is vertically pivotable. And, there is provided an urging means 38 such as a weight for urging this parallel link mechanism 37 to the rising pivotal side. Further, there is provided a limit restricting means 39 such as a buffer air cylinder for restricting a pivotal range of the parallel link mechanism 37.

Namely, with this arrangement, normally, the parallel link mechanism 37 will be pivotally raised to an upper limit position restricted by the limit restricting means 39. With this, the spraying means 4 under the downwardly oriented posture can be maintained at an upper position in the painting area 2. And, under this state, the spraying means 4 can spray paint onto the painting object W.

On the other hand, at the time of e.g. maintenance operation for the spraying means 4, against the urging force of the urging means 38, the parallel link mechanism 37 will be pivotally lowered to a lower limit position where this parallel link mechanism 37 assumes a perpendicularly downward orientation. In association with this, as the urging direction of the urging means 38 is reversed, the spraying means 4 under the downward oriented posture will be maintained at a lower position in the painting area 2. And, under this state, maintenance operation for the spraying means 4 can be carried out.

In forming the air curtain (fa) which flows downwards along the one lateral wall 2w of the painting area 2 (the painting area lateral wall opposite the robot installing area 5), as shown in FIG. 15, at an intermediate position in a direction of thickness of the air curtain (fa), there can be provided an air flow guiding face 40 disposed under an inclined posture with an upper end thereof being closer to the painting area lateral wall 2w than a lower end thereof.

Namely, according to the above-described arrangement, the air curtain air flow (fa) flowing downward along the painting area lateral wall 2w is divided by the air flow guiding face into a low-speed air flow portion (fa1) on a side near the painting area lateral wall 2w and a high-speed air flow portion (fa2) on a side distant from the painting area lateral wall 2w.

And, due to the effect of the high-speed air flow portion (fa2) on the side distant from the painting area lateral wall 2w, there is generated an air flow component which flows from the low-speed air flow portion (fa1) on the side near the painting area lateral wall 2w toward the high-speed air flow portion (fat) on the side distant from the painting area lateral wall 2w. With this, in comparison with an arrangement of causing an air curtain having a constant air flow rate to flow down along the painting area lateral wall, paint adhesion to the painting area lateral wall 2w due to paint scattering from the inner side of the painting area can be prevented even more effectively.

INDUSTRIAL APPLICABILITY

The object to be painted (i.e. "painting object") by the inventive painting facility is not limited to a bumper of an automobile. Namely, the inventive painting facility can be used for painting of a variety of objects.

DESCRIPTION OF REFERENCE MARKS/NUMERALS

4: spraying means
2: painting area
6: painting robot
5: robot installing area
7a: arm leading end portion
W: painting object (object to be painted)
sa, sb ventilation air
27: robot installing area air feeding opening
ra: air flow
2w: painting area lateral wall
fa: air curtain
31: air curtain air feeding opening
32: air discharging area
29: sock filter
35: air curtain nozzle box
35a: throttle mechanism
d: width size of air curtain air feeding opening
30: over duct
30a: porous structure
36: paint tank installing chamber
19: controlling means
34: partition wall or hanging wall or air curtain
40: air flow guiding face

The invention claimed is:
1. A painting facility, comprising:
a sprayer for spraying paint downward is disposed at an upper portion of a painting structure defining a painting chamber;
a painting robot;
a robot installing chamber for installing the painting robot, wherein the robot installing chamber is disposed laterally adjacent the painting chamber;
wherein an arm leading end portion of the painting robot is configured to hold a painting object that is painted by paint spraying from the sprayer while displacing the painting object relative to and downwardly of the sprayer by an action of the painting robot;
an air feeding opening for the robot installing chamber is provided for directing ventilation air to the robot installing chamber; and
by air feeding from the air feeding opening, the robot installing chamber is placed under a higher pressure than the painting chamber adjacent thereto, thereby to form an air flow which flows from the robot installing chamber into the painting chamber,
wherein a sock filter for feeding ventilation air to an upper portion of the painting chamber and an air curtain air feeding opening for forming an air curtain which flows downward along a painting chamber lateral wall disposed opposite the adjacent robot installing chamber are provided at upper portions of the painting chamber,
wherein downwardly of the painting chamber, there is formed an air discharging area for discharging downward air present inside the painting chamber,
wherein the sock filter for discharging the ventilation air fed therein through a circumferential portion thereof is disposed under a horizontal posture at an upper portion of the painting chamber,
wherein an air curtain air discharging box having the air curtain air feeding opening in a lower face portion thereof is disposed at an upper portion of the painting chamber in close vicinity of the painting chamber lateral wall, and
wherein a leading end portion of the sock filter is connected to and opened into the air curtain air discharging box.

2. The painting facility according to claim 1, wherein at a connection portion of the sock filter relative to the air curtain air discharging box, there is incorporated an air amount damper for restricting an amount of air which flows from the leading end portion of the sock filter into the air curtain air discharging box.

3. The painting facility according to claim 1, wherein:
the air curtain air feeding opening and the sprayer are disposed side by side coaxially in a juxtaposing direction of the painting chamber and the robot installing chamber as seen in a plan view; and
a size of the air curtain air feeding opening in a spraying area width direction is set smaller than a size of the painting chamber lateral wall in the painting chamber width direction.

4. The painting facility according to claim 1, wherein:
in each of opposed vertical corner portions of the painting chamber lateral wall disposed opposite the robot installing chamber, there is disposed a paint tank installing chamber having an approximately triangular cross sectional shape as viewed in a plan view; and
the air curtain air feeding opening has a plan view shape which is a trapezoidal shape surrounded by the painting chamber lateral wall and chamber walls of the paint tank installing chambers.

5. The painting facility according to claim 1, wherein:
a programmable computer is provided for automatically operating the painting robot according to a preset operational program; and
the programmable computer displaces the painting object relative to the sprayer while changing the posture of the painting object in such a manner as to maintain a painting object face in the painting object at each timing at a posture approximately perpendicular to the direction of paint spraying from the sprayer.

6. The painting facility according to claim 5, wherein:
a plurality of the painting chambers are disposed side by side in a row, and in correspondence with these painting chambers, a plurality of the robot installing chambers are disposed side by side in a row in a painting chamber juxtaposing direction; and
the programmable computer is configured to send the painting object to the plurality of painting chambers in series by way of transfer of the object between the painting robots installed in the respective adjacent robot installing chambers.

7. The painting facility according to claim 1, wherein:
a plurality of the painting chambers are disposed side by side in a row, and in correspondence with these painting chambers, a plurality of the robot installing chambers are disposed side by side in a row in a painting chamber juxtaposing direction;
the adjacent painting chambers are partitioned from each other by a partition wall, a hanging wall or an air curtain in the painting chamber juxtaposing direction; and
the adjacent painting robot installing chambers are either opened to each other in the painting chamber juxtaposing direction or partitioned from each other in the painting chamber juxtaposing direction.

8. The painting facility according to claim 1, wherein at an intermediate position in a direction of thickness of the air curtain which flows downwards along the painting chamber lateral wall disposed opposite the robot installing chamber, there is provided an air flow guiding face disposed under an inclined posture with an upper end thereof being closer to the painting chamber lateral wall than a lower end thereof.

9. The painting facility according to claim 1, wherein the sprayer is disposed in the painting chamber to be liftable up/down.

* * * * *